United States Patent [19]

Nonami

[11] Patent Number: 5,251,232
[45] Date of Patent: Oct. 5, 1993

[54] RADIO COMMUNICATION APPARATUS

[75] Inventor: Takayuki Nonami, Hyogo, Japan

[73] Assignee: Mitsubishi Denki Kabushiki Kaisha, Tokyo, Japan

[21] Appl. No.: 789,905

[22] Filed: Nov. 12, 1991

[30] Foreign Application Priority Data

Mar. 6, 1991 [JP] Japan .................................. 3-063750

[51] Int. Cl.⁵ ....................... H04L 25/00; H04B 13/02
[52] U.S. Cl. ............................................ 375/5; 375/7; 332/117; 329/315; 455/84
[58] Field of Search ................... 375/88, 5, 2; 332/300, 332/117; 329/315; 341/84, 88, 142, 74; 455/84, 74, 142, 88

[56] References Cited

U.S. PATENT DOCUMENTS 5,119,397 6/1992 Dahlin et al. ........................... 375/5

OTHER PUBLICATIONS

Nikkei Electronics 1991.2.4 (No. 519), "DSP Used for Digital Mobile Telephone", 1986, pp. 149–154.
Mitsubishi Denki Giho, "A New Mobile Telephone Apparatus for Exporting Abroad", vol. 60, No. 10, 1986, pp. 55–59.

Primary Examiner—Curtis Kuntz
Assistant Examiner—Tesfaldet Bocure
Attorney, Agent, or Firm—Rothwell, Figg, Ernst & Kurz

[57] ABSTRACT

A radio communication apparatus used for both digital communications and analog communications is disclosed which comprises a digital signal processor DSP (4) which processes many kinds of digital signals according to a plurality of signal procedures (55,56,57,58) stored in the ROM (5). In the present invention, since the radio communication apparatus processes many kinds of procedures (55,56,57,58) stored in the ROM (5), the size of the apparatus becomes small and weight becomes light.

6 Claims, 3 Drawing Sheets

RADIO COMMUNICATION APPARATUS

BACKGROUND OF THE INVENTION

1. Field of the Invention

The invention relates to a radio communication apparatus used for both digital communications and analog communications.

2. Description of the Prior Art

FIG. 3 shows a block diagram of a conventional radio communication apparatus. In FIG. 3, a microphone 1 changes human voice to voice signal. A linear codec 3 converts the voice signal to a digital signal. A digital signal processor (DSP) 4 processes the digital signal. A ROM 52 stores instruction codes (voice coding procedures) used in the DSP 4. A digital modulation/demodulation portion 6 modulates the coded digital signal to form the modulated digital signal and demodulates the modulated signal to form the coded digital signal.

An analog voice signal processing portion 12 modulates the voice signal to form the modulated voice signal and demodulates the modulated voice signal to form the voice signal. An FM modulation/demodulation portion 10 modulates the modulated voice signal to form the FM signal and demodulates the FM signal to form the modulated voice signal. A radio frequency transmitter/receiver 7 amplifies the signals which are received from the modulation/demodulation portion 6 or FM modulation/demodulation portion 10 and sends them to an antenna 8, and receives radio frequency signal from the antenna 8 and sends them to digital modulation/demodulation portion 6 or the FM modulation/demodulation portion 10. A speaker 2 converts the voice signal which is received from linear codec 3 or analog voice signal processing portion 12 to the voice and outputs the voice. A control portion 11 controls the devices in the radio communication apparatus.

The operation of the above conventional art is explained hereinafter.

(1) In the case of voice signal processed in a digital manner.

Firstly, the voice which is input to the microphone 1 is converted to an analog signal and is sent to a linear codec 3. The linear codec 3 converts the analog voice signal which is received from the microphone 1 to the digital signal and outputs it to the DSP 4. The DSP 4 processes the digital signal which is received from the linear codec 3 according to the voice coding procedure which is stored in the ROM 52 and sends the coded signal to the digital modulation/demodulation portion 6. The digital modulation/demodulation portion 6 modulates the carrier signal by the coded signal and outputs the digital modulated signal to the radio frequency transmitter/receiver 7. The radio transmitter/receiver 7 amplifies the received digital modulated signal and sends it to the base station via the antenna 8.

When the radio frequency signal are received from the base station via the antenna 8, the radio frequency transmitter/receiver 7 sends the radio signal to the digital modulation/demodulation portion 6. The digital modulation/demodulation portion 6 demodulates the digital modulated signal and outputs the demodulated signal to the DSP 4. The DSP 4 decodes the demodulated signal according to the signal procedure stored in the ROM 52 and sends the decoded digital voice signal to the linear codec 3. The linear codec 3 converts the digital voice signal to the analog voice signal and sends it to the speaker 2. The speaker 2 converts the analog voice signal to voice output.

(2) In the case of voice signal processed in an analog manner.

Firstly, the voice which is input in the microphone 1 is converted to an analog signal and is sent to an analog voice signal processing portion 12. The analog voice signal processing portion 12 modulates the analog signal to the modulation voice signal for FM transmission and sends it to the FM modulation/demodulation portion 10. The FM modulation/demodulation portion 10 modulates the carrier signal by the modulation voice signal and outputs the modulated FM signal to the radio frequency transmitter/receiver 7. The radio frequency transmitter/receiver 7 amplifies the received modulated FM signal and sends to the base station from the antenna 8.

When the radio frequency FM signal are received from the base station via the antenna 8, the radio frequency transmitter/receiver 7 sends the radio frequency FM signal to the FM modulation/demodulation portion 10. The FM modulation/demodulation portion 10 demodulates the radio frequency FM signal and outputs the demodulated signal to the analog voice signal processing portion 12. The analog voice signal processing portion 12 demodulates the demodulated signal to form the analog voice signal and sends it to the speaker 2. The speaker 2 converts the analog voice signal to voice output.

The control portion 11 controls the devices in the radio communication apparatus and changes the control between digital communications and analog communications.

As the conventional radio communication apparatus is constructed as explained above, the signal goes through the linear codec 3 and DSP 4 during digital communications, and it goes through the analog voice signal processing portion 12 during analog communications. That is, since the voice processing portion for digital and analog communications are provided separately, the circuit configuration becomes large and also expensive.

It is a primary object of the present invention to provide a radio communication apparatus having a small size voice processing portion and thereby to provide an inexpensive and light weight radio communication apparatus.

SUMMARY OF THE INVENTION

The radio communication apparatus of the present invention includes a first linear codec for converting the analog signal to digital signal, and for converting the digital signal to analog signal, a ROM for storing a plurality of signal procedures used for analog communications and digital communications. The radio communication apparatus also includes a digital signal processor for processing the digital coded signal which are received from the first linear codec and outputs the coded signal to a digital modulation/demodulation portion according to the corresponding signal procedure stored in the ROM, and for processing the input coded signal according to said signal coding procedure stored in the ROM and outputs the decoded digital voice signal, to the first linear codec in the case of digital communications; and for processing the digital voice signal which are received from the first linear codec 3 and outputs the digitized coded signal according to the signal procedure stored in the ROM to a second linear codec, and for processing the digital demodulated signal according to the signal procedure stored in the ROM and outputs the digital demodulated signal, in the case of analog communications. The radio communication apparatus further includes a digital modulation/demodulation portion for generating the digital modulated signal from the digital coded signal, and for generating the digital coded signal from the digital modulated signal. The radio communication apparatus still includes a second linear codec being placed between the DSP and a FM modulation/demodulation portion and generating analog modulation signal from digitized coded signal, and for generating digital demodulated signal from analog demodulated signal. Moreover the radio communication apparatus includes a FM modulation/demodulation portion for generating analog FM modulated signal from the analog modulated signal, and for generating the analog demodulated signal from the analog radio frequency FM signal.

DETAILED DESCRIPTION OF THE PREFERRED EMBODIMENTS

Figure 1:
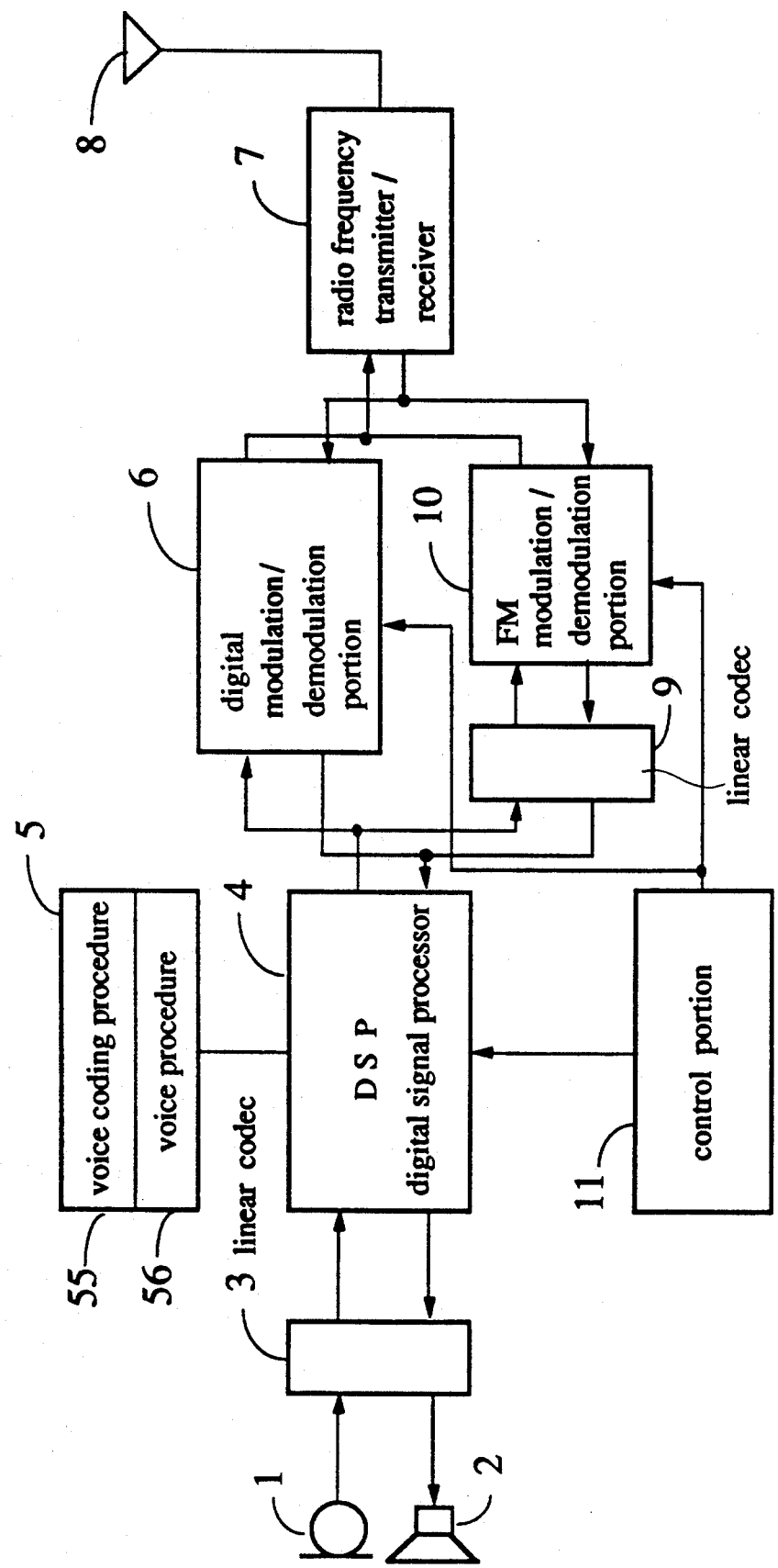
FIG. 1 is a block diagram of a first embodiment of a radio communication apparatus in accordance with the present invention.
Figure 3:
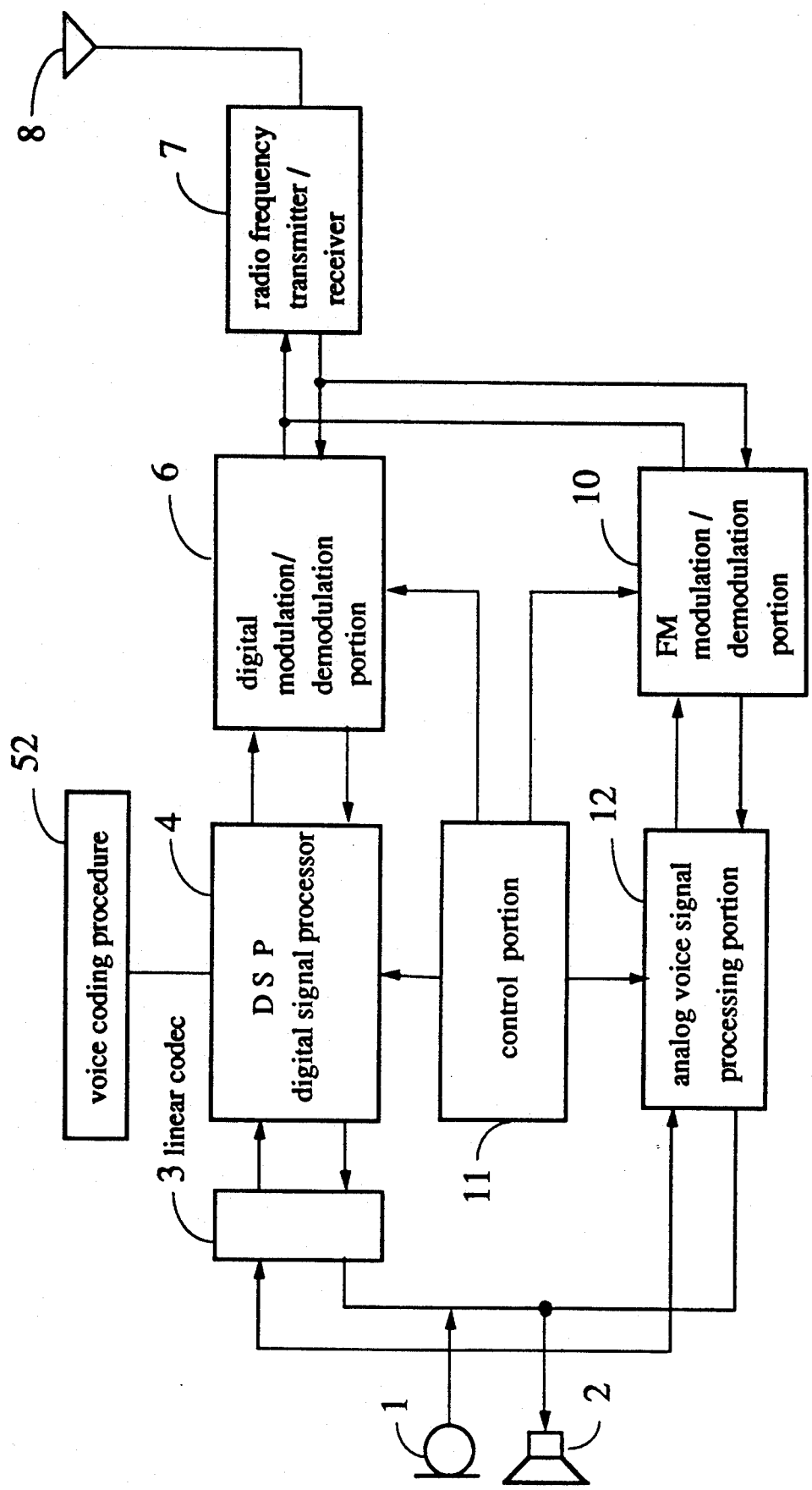
FIG. 3 shows a block diagram of the conventional art.

FIG. 1 shows a block diagram of a radio communication apparatus of a first embodiment of the present invention. A ROM 5 stores a voice coding procedure 55 for digital communication of the digitized voice signal and a voice procedure 56 for analog communication of the digitized voice signal. A linear codec 9 is placed between the DSP 4 and the FM modulation/demodulation portion 10 and generates an analog modulation signal from the digitized coded signal, and generates a digital demodulated signal from analog demodulated signal. The reference numbers in FIG. 1 which are the same as those used in FIG. 3 for the same portions or the corresponding portions. Therefore, the detailed explanation concerning the same reference numbers is abbreviated.

The operation of the first embodiment of the present invention is explained hereinafter.

(1) In the case of voice signal processed in a digital manner.

In the first embodiment, when the voice signal is transmitted in the digital manner from the antenna, the control portion 11 sends the digital mode information to the DSP 4 and activates the digital modulation/demodulation portion 6 and deactivates the FM modulation/demodulation portion 10. The DSP 4 also selects the voice coding procedure 55 stored in the ROM 5.

Firstly, the voice which is input in the microphone 1 is converted to an analog signal and is sent to a first linear codec 3. The linear codec 3 converts the analog signal which is received from the microphone 1 to a digital signal and outputs it to the DSP 4. The DSP 4 processes the digital signal which is received from the linear codec 3 according to the signal voice procedure 55 which is stored in the ROM 5 and outputs the coded digital signal to the modulation/demodulation portion 6. The digital modulation/demodulation portion 6 modulates the carrier signal by the digital coded signal and ouputs the digital modulated signal to the radio frequency transmitter/receiver 7. The radio frequency transmitter/receiver 7 amplifies the received digital modulated signal and sends it to the base station via the antenna 8.

When the digital radio frequency signal is received from the base station via the antenna 8, the radio frequency transmitter/receiver 7 sends the radio signal to the digital modulation/demodulation portion 6. The digital modulation/demodulation portion 6 demodulates the digital modulated signal and outputs the digital coded signal to the DSP 4. The DSP 4 decodes the digital coded signal to the decoded digital voice signal according to the signal coding procedure 55 stores in the ROM 5 and sends it to the linear codec 3. The linear codec 3 converts the digital voice signal to the analog voice signal and sends it to the speaker 2. The speaker 2 converts the analog voice signal to voice output.

(2) In the case of voice signal processed in an analog manner.

When the voice signal is sent in the analog manner, the control portion 11 sends the analog mode information to the DSP 4. Then the control portion 11 also activates the FM modulation/demodulation portion 10, and deactivates the digital modulation/demodulation portion 6. The DSP 4 also selects the voice procedure 56 stored in the ROM 5.

Firstly, the voice which is input in the microphone 1 is converted to an analog voice signal and is sent to a first linear codec 3. The linear codec 3 converts the analog signal which is received from the microphone 1 to a digital voice signal and outputs it to the DSP 4. The DSP 4 converts the digital voice signal which is received from the linear codec 3 to the digitized coded signal according to the signal procedure 56 which is stored in the ROM 5 and sends it to the second linear codec 9. The second linear codec 9 converts the digitized coded signal to the analog modulation signal and sends it to the FM modulation/demodulation portion 10. The modulation/demodulation portion 10 modulates the carrier signal by the modulation signal and outputs the analog FM modulated signal to the radio transmitter/receiver 7. The radio frequency transmitter/receiver 7 amplifies the received FM modulated signal and sends it to the base station via the antenna 8.

When the antenna 8 receives an analog radio signal from the base station, the antenna 8 sends it to the FM modulation/demodulation portion 10 via the radio frequency transmitter/receiver 7. The FM modulation/demodulation portion 10 demodulates the radio frequency FM signal and outputs the analog demodulated signal to the second linear codec 9. The second linear codec 9 converts the analog demodulated signal to the digital demodulated signal and sends it to the DSP 4. The DSP 4 converts digital demodulated signal to the digital voice signal according to the voice procedure 56 stored in the ROM 5 and sends it to the linear codec 3. The linear codec 3 converts the digital voice signal to the analog voice signal and sends it to the speaker 2. The speaker 2 converts the analog voice signal to voice output.

In the above embodiment, it is to be noted that the DSP 4 processes the basic voice procedure of both the digital communication and the analog communication modes.

Further, the DSP 4 can process other procedures in addition to the basic voice procedure such as voice recognition procedure and echo cancellation procedure.

Figure 2:
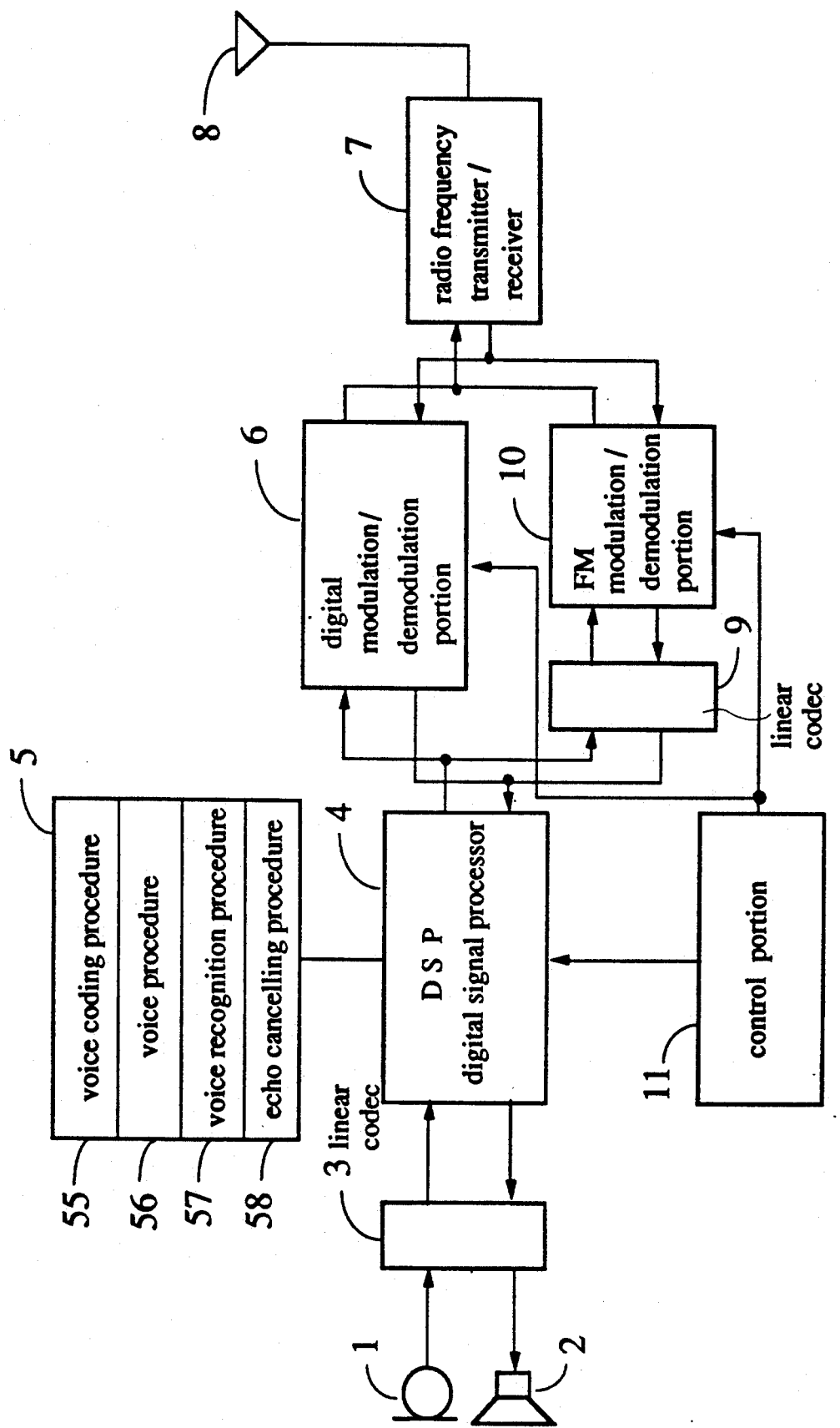
FIG. 2 is a block diagram of a second embodiment of a radio communication apparatus in accordance with the present invention.

FIG. 2 shows a second embodiment of the present invention which processes additional voice recognition procedure and echo cancellation procedure. In the second embodiment, the ROM 5 includes the voice recognition procedure 57 and an echo cancellation procedure 58 stored in it.

In the second embodiment, the control portion 11 sends the mode information to the DSP 4. The DSP 4 selects one of the procedures and processes the selected procedure from the stored procedures 55 to 58.

In the present embodiment, DSP 4 operates for each procedure selected from a number of procedures. Accordingly, only one DSP 4 is provided for the radio communication apparatus. As a result, the radio communication apparatus becomes small in size.

The embodiments described above may be applied to the apparatus having functions for data transmission and facsimile transmission as well as voice transmission by providing the corresponding procedure for each function stored in the ROM 5.

What is claimed is:

1. A radio communication apparatus useful for both digital communications and analog communications comprising:

a first linear codec for converting an analog signal to a digital signal, and for converting a digital signal to an analog signal;

a ROM for storing a plurality of signal procedures used for the processing of analog communications and digital communications;

a digital signal processor (DSP) connected to said first linear codec for processing digital signals which are received from and delivered to said first linear codec by said DSP according to said corresponding signal procedures stored in the ROM;

a control portion connected to said DSP for controlling the processing according to signal procedures stored in said ROM of digital signals received from and delivered to said first linear codec for both the analog communications and digital communications of said communications apparatus;

a digital modulation/demodulation portion connected on the opposite side of said DSP from said first linear codec for generating digital modulated signals from digital coded signals delivered to said digital modulation/demodulation portion by said DSP, and for generating coded digital signals to be delivered to said DSP from digital modulated signals received by said digital modulation/demodulation portion;

an FM modulation/demodulation portion for generating analog FM modulated signals from analog modulation signals, and for generating analog demodulated signals from analog FM modulated signals; and a second linear codec positioned between the DSP and said FM modulation/demodulation portion, for generating said analog modulation input signal to said FM modulation/demodulation portion from digital coded signals received from said DSP, and for generating digital demodulated signals for delivery to said DSP from said analog demodulated signals received from said FM modulation/demodulation portion;

whereby communication signals for both digital communications and analog communications are processed through said DSP in digital form.

2. The radio communication apparatus of claim 1, wherein said ROM includes a voice coding procedure for processing digital signals using said digital modulation/demodulation portion.

3. The radio communication apparatus of claim 1, wherein said ROM includes a voice procedure for processing analog signals using said FM modulation/demodulation portion.

4. The radio communication apparatus of claim 1, wherein said ROM includes a data procedure for processing digital data signals.

5. The radio communication apparatus of claim 1, wherein said ROM includes a voice recognition procedure for processing voice recognition signals.

6. The radio communication apparatus of claim 1, wherein said ROM includes an echo canceling procedure for processing echo canceling signals.

* * * * *

UNITED STATES PATENT AND TRADEMARK OFFICE
CERTIFICATE OF CORRECTION

PATENT NO. : 5,251,232
DATED : October 5, 1993
INVENTOR(S) : Takayuki Nonami

It is certified that error appears in the above-indentified patent and that said Letters Patent is hereby corrected as shown below:

Col. 1, line 58, "signal" should be -- signals --; Col. 2, line 16, between "sends" and "to", insert -- it --; Col. 4, line 16, "stores" should be -- stored --.

Signed and Sealed this

Twenty-sixth Day of April, 1994

Attest:

BRUCE LEHMAN

Attesting Officer     Commissioner of Patents and Trademarks